United States Patent [19]
Scheffer et al.

[11] 4,252,417
[45] Feb. 24, 1981

[54] LIQUID CRYSTAL DISPLAY

[75] Inventors: Terry J. Scheffer, Forch; Hans R. Zeller, Birr, both of Switzerland

[73] Assignee: BBC Brown, Boveri & Company, Limited, Baden, Switzerland

[21] Appl. No.: 48,084

[22] Filed: Jun. 13, 1979

[30] Foreign Application Priority Data

Jul. 13, 1978 [CH] Switzerland .................. 7615/78

[51] Int. Cl.³ ............................................ G02F 1/133
[52] U.S. Cl. ............................. 350/349; 350/350 R
[58] Field of Search ........................... 350/349, 350 R

[56] References Cited
PUBLICATIONS

Cole et al., "Dependence of Absorption and Optical Contrast of a Dichroic Dye Guest on the Pitch of a Chiral Nemalic Host", *Applied Physics Letter*, vol. 31, pp. 58–59, Jul. 15, 1977.
White et al., "New Absorptive Mode Reflective Liquid-Crystal Display Device", *Journal of Applied Physics*, vol. 45, pp. 4718–4723, Nov. 1974.

*Primary Examiner*—Edward S. Bauer
*Attorney, Agent, or Firm*—Oblon, Fisher, Spivak, McClelland & Maier

[57] ABSTRACT

A liquid crystal display is described for displaying dark signs on a light background in accordance with the guest-host principle without polarizers. The display includes parallel plates the insides of which are provided with an orientation layer which produces a homoeotropic orientation in an adjacent liquid crystal mixture. The liquid crystal mixture is formed primarily of a nematic liquid crystal having a high negative dielectric anisotropy and, secondarily, of an optically active substance. The proportion of the optically active substance is smaller than the quantity which would cause a spontaneous formation of a twisted structure in the liquid crystal mixture in the field-free state. The liquid crystal mixture is thus homoeotropically oriented and transparent throughout in the field-free regions, and is planar-cholesteric and absorbing in the activated regions.

13 Claims, 2 Drawing Figures

LIQUID CRYSTAL DISPLAY

BACKGROUND OF THE INVENTION

1. Field of the Invention

The invention relates to a liquid crystal display in accordance with the "guest/host principle" as described in J. Appl. Phys. Volume 45, No. 11, November 1974, page 4718–4723, such a surface structure being provided on the insides of the plates of the cell containing the liquid crystal mixture that the adjacent liquid crystal molecules are oriented homoeotropically, i.e. are aligned substantially perpendicular to the surface of the plates (ibid., page 4722, FIG. 2b).

2. Description of the Prior Art

The hitherto known liquid crystal displays in accordance with the guest/host principle have the important advantage, compared with the nematic twist cells predominantly used at present, that they can be operated without polarizers and with an internal reflector. However, it is a disadvantage that, with the known guest-/host liquid crystal displays, only light numerals can be represented on a moderately dark or colored background, which results in poor readability.

Attempts to represent dark numerals on a light background in the manner of nematic twist cells by means of such displays have hitherto led only to very complicated solutions having relatively high power consumption and therefore have not gained acceptance in practice.

SUMMARY OF THE INVENTION

Accordingly, an object of this invention is to provide a novel liquid crystal display of the type initially indicated in such a way that it is transparent in regions without an electric field and is light-absorbing in regions which are electrically activated, coupled with advantageous production technology, good contrast and low power consumption in operation.

These and other objects are achieved by providing a novel liquid crystal display, comprising two parallel plates (1, 2) which form a cell, are covered on their inside surfaces with layer-type electrodes (3, 4) and do not have polarizers on their outsides. Between the plates a liquid crystal mixture (5) is provided a major part of which consists of a nematic liquid crystal and a minor part of which consists an optically active substance, preferably a cholesteric substance. The liquid crystal mixture further includes an addition of pleochroic dye molecules. On the inside of the plates, a surface structure is provided which produces a homoeotropic orientation in the adjacent liquid crystal mixture. The nematic liquid crystal has a negative dielectric anisotropy and the proportion of the optically active, preferably cholesteric, substance is smaller than the quantity with which, in the absence of an electrical potential between the electrodes, the spontaneous formation of twisted structure occurs in the liquid crystal mixture.

The concentration, measured in percent by weight, of the optically active, preferably cholesteric, substance in the total mixture consisting of the nematic liquid crystal and the optically active substance and the dye molecules is at most equal to the critical concentration $C_0 = A/d$, wherein the cell thickness d is equal to the separation between the plates, measured in $\mu m$, and A is a constant which depends on the nature of the optically active, preferably cholesteric, substance.

A suitable optically active substance is a cholesteryl ester, preferably cholesteryl benzoate, in which case the constant $A = 11.0$.

A suitable nematic liquid crystal is a mixture of aromatic esters or an $\alpha$-cyanostilbene. Similarly, suitable pleochroic dye molecules are anthraquinone dyestuffs. For the purpose of generating the surface structure which produces the homoeotropic orientation, the insides of the cell plates are covered with an alkoxysilane layer.

Preferably the nematic liquid crystal exhibits a magnitude of dielectric anisotropy/$\Delta\epsilon$/greater than 0.5.

The liquid crystal display is powered from a power source which applies an effective electrical control potential to the cell of at most equal to 10 V. In the liquid crystal display of the invention, the proportion of the optically active, preferably cholesteric, substance is such that, when a control potential is applied between the electrodes, the molecules of the liquid crystal mixture are twisted by at least 360° over the cell thickness d. The twist has a pitch p which is at most equal to the cell thickness d.

The liquid crystal display according to the invention combines the advantages of the known guest/host displays, that is to say virtually no angle dependence of the reading, no parallax, no polarizers and a high brightness, with the advantages of the nematic twist cell which displays dark signs on a light background.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
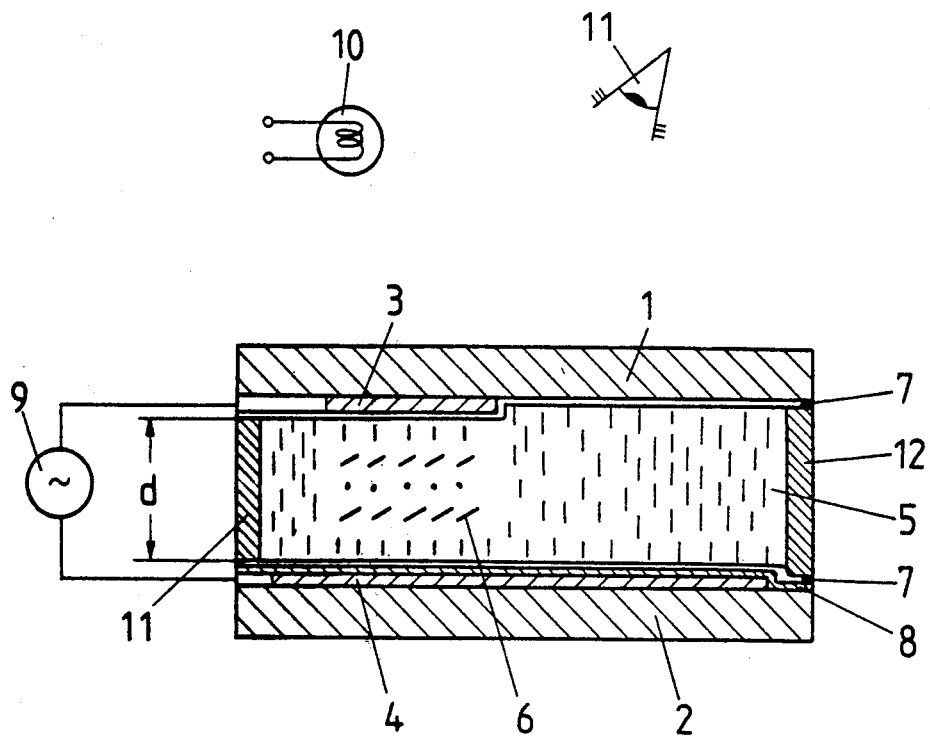
FIG. 1 is a cross-sectional view taken through the cell of a liquid crystal display based on the guest/host principle, according to the invention.

Referring now to the drawings, the cell shown is formed by the front plate 1 and the back plate 2 as well as the spacer element 12. The cell is tightly sealed and contains in its interior a liquid crystal mixture 5. The plates 1 and 2 are covered with layer-type electrodes, that is to say the front electrode 3 and the back electrode 4. Above the electrode layers 3, 4, the plates 1, 2 are each covered on their insides with an orientation layer 7 which, with respect to the adjacent liquid cystal mixture, produces such a surface structure that the liquid crystal molecules are homoeotropically oriented. At least the front plate 1, the front electrode 3 and the orientation layer 7 are transparent so that the light emitted by the light source 9 can pass therethrough.

While the back electrode 4 is shown as covering the entire back plate 2, the representation of the front electrode 3 is intended to indicate a segmentation. When an alternating potential is applied between the electrodes 3 and 4 by means of the electric potential source 9, an electric field is thus produced in the liquid crystal mixture 5 below the hatched part of the front electrode 3, while the other regions of the liquid crystal mixture 5 are field-free.

According to the invention, the liquid crystal mixture 5 which forms the host for the pleochroic dye molecules 6 now includes a nematic liquid crystal, having a negative dielectric anistropy $\Delta\epsilon$, and an optically active, preferably cholesteric, substance, the proporation of which in the liquid crystal mixture 5 is smaller than the quantity with which a spontaneous formation of a twisted structure occurs when there is no field.

The nematic liquid crystal should have the largest possible negative dielectric anisotropy. For this reason, $\alpha$-cyanostilbenes, for example p-ethoxy-p'-hexyloxy-$\alpha$-cyano-trans-stilbene (See Phys. Lett. Volume 44A, No. 4, June 18, 1973, page 277) have $\Delta\epsilon = -5.5$, are preferred. Mixtures of aromatic esters, such as the nematic liquid crystals having $\Delta\epsilon = -0.5$, supplied by E. Merck AG, Darmstadt (Federal Republic of Germany) under the name 9A, can also be used.

The optically active substance is selected in such a way that, if possible, it has no dipole moment along the longitudinal axis of its molecules. This would reduce the negative dielectric anisotropy of the nematic liquid crystal. Optically active cholesteryl esters, for example cholesteryl benzoate, are preferred since these substances have a high twisting power.

A dyestuff having the highest possible pleochrotic ratio in the nematic host (ratio of the optical density in the parallel position and in the perpendicular position of the molecules with respect to the direction of oscillation of linearly polarized light) in the visible wavelength range, preferably the pleochroic anthraquinone dyestuff D 37 supplied By BDH Chemicals Ltd., Broom Road, Poole BH 124 NN, England, is added as the guest to the liquid crystal mixture as the host. This dyestuff has a pleochrotic ratio of about 5.3 in the nematic liquid crystal 9A from E. Merck AG.

As the orientation layer 7, an alkoxysilane layer, for example, "DMOAP", as supplied by Dow Corning International Ltd., Brussels (Belgium), under the name XZ 2-2300, is advantageously applied in the manner described in Appl. Phys. Letters, Volume 22, No. 8, April 1973 pages 386–388, or in U.S. Pat. No. 3,854,793.

To prevent a spontaneous formation of a twisted structure in the field-free stage in the liquid crystal mixture 5, the concentration, measured in percent by weight, of the optically active substance in the total mixture consisting of the nematic liquid crystal, the optically active substance and the dyestuff addition must not be greater than the limiting concentration $$C_O = A/d.$$

where d is the cell thickness measured in $\mu$m, that is to say the separation between the inner surfaces of the plates 1 and 2, and A is a constant which depends on the nature of the optically active, preferably cholesteric, substance. For cholesteryl benzoate, $A = 11.0$.

The formula applies in particular to cholesteryl benzoate in Merck 9A. With the dyestuff D 37 and a cell thickness of $d = 6.3$ $\mu$m, the following composition of the total mixture then results:
Merck 9A: 96.24% by weight
Cholesteryl benzoate: 1.42% by weight
D 37: 2.34% by weight The determination of the limiting amount of optically active substance in the nematic liquid crystal, with which a spontaneous formation of a twisted structure in the field-free state does not yet occur, can also be carried out as described in 37 Berichte der BunsenGesellschaft", Volume 78, No. 9, 1974, in particular page 884, FIGS. 1 and 2. In the measuring arrangement therein described, the proportion of optically active substance in the nematic liquid crystal would have to be selected in such a way that the critical layer thickness $d_O$, at which the transition from a homoeotropic structure to a twisted structure takes place, is equal to the cell thickness d. In this method, the surfaces of the plane-parallel glass plate and of the plano-convex lens are provided with the same orientation layer as the liquid crystal cell intended for operation in practice.

The proportion of optically active substance in the liquid crystal mixture is in general selected to be as close as possible to the critical concentration $C_O$, since a poorer contrast is obtained when the proportion is too small. As a rule, a higher working potential then also becomes necessary, and this is technically undesirable.

In FIG. 1, the back plate 2 which, for example, consists of glass is provided above the electrode layer 4 and below the orientation layer 7 with an internal reflector 8 consisting of aluminium pigments, as described, for example, in DE-OS No. 2,629,765. The reflector 8 reflects the light passing through the liquid crystal mixture 5. The reflected light is perceived by the observer 10.

Using a total mixture consisting of the liquid crystal mixture 5 and the dyestuff molecules 6 in the composition indicated above, the state indicated in FIG. 1 then results, i.e. in the field-free regions outside the region below the hatched part of the electrode 3, the total mixture has a homoeotropic orientation and, below the hatched part of the electrode 3, where an electric field exists due to the activation, a twisted structure is established. In the homoeotropic regions, the longitudinal axes of the dye molecules are parallel to the incident light and thus effect a minimum of absorption. By contrast, maximum absorption takes place in the twisted regions.

Figure 2:
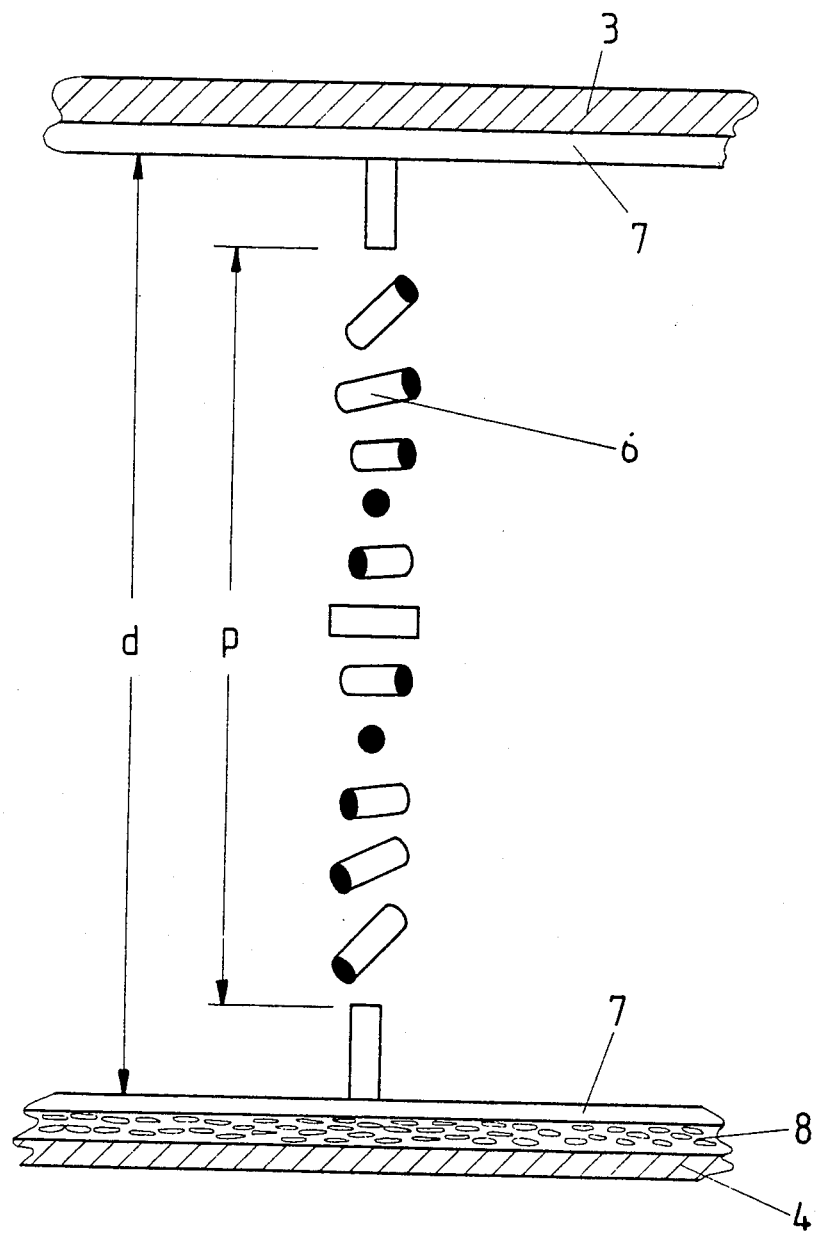
FIG. 2 is a schematic illustration of the twisting of the liquid crystal mixture in a cell according to the invention under the action of an electric field.

The twisted region is again shown diagrammatically in FIG. 2.

A cell according to the invention can, for example, be operated with a working voltage of 2 kHz and less than 10 $V_{eff}$.

Essentially, the invention is based on the discovery that it is possible, on the one hand, in spite of the addition of a cholesteric compound, to produce a homoeotropic orientation of the molecules and hence a minimum absorption with a corresponding surface structure of the plates 1, 2 in the liquid crystal mixture 5 and, on the other hand, while utilizing the negative dielectric anisotropy of the nematic liquid crystal, to switch over this orientation to a twisted structure and hence a maximum absorption, by applying an electric potential. The greater the amount of the negative dielectric anisotropy of the nematic liquid crystal, the smaller can the activation potential be, which is desirable.

At the limiting concentration $C_O$ of the cholesteric substance, which still just leads to a homoeotropic orientation in the field-free state, it is possible to achieve a homogeneously planar structure with a twist of about 360° over the cell thickness d, as shown in FIG. 2, on activation in the liquid crystal mixture 5. This suffices to produce a strong absorption in all the directions of oscillation of the incident light. The state then corresponds to a pitch p of the twist of about the cell thickness d.

In addition to a large negative dielectric anisotropy, the liquid crystal mixture 5 should also have the smallest possible optical birefringence Δn, since the achievable contrast deteriorates with increasing Δn. The nematic liquid crystal Merck 9A has a Δn=+0.15, but even substances having Δn=+0.08 are known.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A liquid crystal display comprising:
   two parallel plates having inside surfaces on which are formed layer-type electrodes and between which is disposed a liquid crystal mixture to form a liquid crystal cell, said plates having outside surfaces on which no polarizers are disposed;
   said liquid crystal mixture comprising primarily a nematic liquid crystal having a negative dielectric anisotropy and secondarily an optically active substance, said liquid crystal mixture further comprising an addition of pleochrotic dye molecules;
   wherein, on the inside of the plates, a surface structure is provided which produces a homoeotropic orientation in the adjacent liquid crystal mixture, and,
   wherein the proportion of the optically active substance is smaller than the quantity with which, in the absence of an electrical potential between the electrodes, the spontaneous formation of a twisted structure occurs in the liquid crystal mixture.

2. A liquid crystal display according to claim 1 wherein said optically active substance comprises:
   a cholesteric substance.

3. A liquid crystal display according to claim 1, wherein the concentration, measured in percent by weight, of the optically active substance in the total mixture including the nematic liquid crystal and the optically active substance and the dye molecules is at most equal to the critical concentration $C_0=A/d$, wherein d is the cell thickness equal to the separation between the plates measured in $\mu m$, and A is a constant which depends on the nature of the optically active substance.

4. A liquid crystal display according to claim 3, wherein the optically active substance comprises:
   a cholesteryl ester.

5. A liquid crystal display according to claim 4, wherein:
   the optically active substance comprises cholesteryl benzoate; and
   constant A equals 11.0.

6. A liquid crystal display according to claim 1, wherein the nematic liquid crystal comprises:
   a mixture of aromatic esters.

7. A liquid crystal display according to claim 1, wherein the nematic liquid crystal comprises:
   an α-cyanostilbene.

8. A liquid crystal display according to claim 1, wherein the pleochrotic dye molecules comprise:
   anthraquinone dyestuffs.

9. A liquid crystal display according to claim 1, wherein the surface structure which produces the homoeotropic orientation comprises:
   an alkoxysilane layer covering the inside surfaces of the cell plates.

10. A liquid crystal display according to claim 1, wherein the nematic liquid crystal comprises:
    a nematic liquid crystal exhibiting a dielectric anisotropy/$\Delta\epsilon$/greater than 0.5.

11. A liquid crystal display according to claim 3, further comprising:
    means for applying an electrical control potential across the electrodes on said two plates, wherein the effective value of the electrical control potential is at most equal to 10 V.

12. A liquid crystal display according to claim 1, wherein the proportion of the optically active substance is such that, when a control potential is applied across the electrodes, the molecules of the liquid crystal mixture are twisted by at least 360° over the cell thickness d.

13. A liquid crystal display according to claim 12, wherein the twist has a pitch p which is at most equal to the cell thickness d.

* * * * *